United States Patent
Latapie et al.

(10) Patent No.: US 11,030,755 B2
(45) Date of Patent: Jun. 8, 2021

(54) MULTI-SPATIAL SCALE ANALYTICS

(71) Applicant: Cisco Technology, Inc., San Jose, CA (US)

(72) Inventors: Hugo Mike Latapie, Long Beach, CA (US); Franck Bachet, Breval (FR); Enzo Fenoglio, Issy-les-Moulineaux (FR); Sawsen Rezig, Nanterre (FR); Carlos M. Pignataro, Cary, NC (US); Guillaume Sauvage De Saint Marc, Sevres (FR)

(73) Assignee: CISCO TECHNOLOGY, INC., San Jose, CA (US)

(*) Notice: Subject to any disclaimer, the term of this patent is extended or adjusted under 35 U.S.C. 154(b) by 0 days.

(21) Appl. No.: 16/743,522

(22) Filed: Jan. 15, 2020

(65) Prior Publication Data

US 2020/0364885 A1 Nov. 19, 2020

Related U.S. Application Data

(60) Provisional application No. 62/847,242, filed on May 13, 2019.

(51) Int. Cl.
*G06K 9/00* (2006.01)
*G06T 7/292* (2017.01)
(Continued)

(52) U.S. Cl.
CPC .............. *G06T 7/292* (2017.01); *G06T 7/194* (2017.01); *G06T 7/254* (2017.01); *G06T 2207/20036* (2013.01); *G06T 2207/20081* (2013.01)

(58) Field of Classification Search
CPC ......... G06T 7/292; G06T 7/194; G06T 7/254; G06T 2207/20036; G06T 2207/20081
(Continued)

(56) References Cited

U.S. PATENT DOCUMENTS

| 7,362,885 | B2* | 4/2008 | Hammoud | G06K 9/00604 |
| | | | | 382/100 |
| 7,787,011 | B2* | 8/2010 | Zhou | G06T 7/277 |
| | | | | 348/143 |

(Continued)

OTHER PUBLICATIONS

Wang, Gaoang, et al. "Exploit the connectivity: Multi-object tracking with trackletnet." Proceedings of the 27th ACM International Conference on Multimedia. 2019. (Year: 2019).*

(Continued)

*Primary Examiner* — Jonathan S Lee
(74) *Attorney, Agent, or Firm* — Polsinelli PC

(57) ABSTRACT

Systems, methods, and computer-readable for multi-spatial scale object detection include generating one or more object trackers for tracking at least one object detected from on one or more images. One or more blobs are generated for the at least one object based on tracking motion associated with the at least one object. One or more tracklets are generated for the at least one object based on associating the one or more object trackers and the one or more blobs, the one or more tracklets including one or more scales of object tracking data for the at least one object. One or more uncertainty metrics are generated using the one or more object trackers and an embedding of the one or more tracklets. A training module for detecting and tracking the at least one object using the embedding and the one or more uncertainty metrics is generated using deep learning techniques.

20 Claims, 9 Drawing Sheets

(51) Int. Cl.
  *G06T 7/254* (2017.01)
  *G06T 7/194* (2017.01)
(58) Field of Classification Search
  USPC .......................................................... 382/103
  See application file for complete search history.

(56) References Cited

U.S. PATENT DOCUMENTS

| | | | |
|---|---|---|---|
| 7,991,193 B2 * | 8/2011 | Hampapur | G06K 9/00369 |
| | | | 382/103 |
| 9,563,843 B2 | 2/2017 | Yufik | |
| 10,157,479 B2 | 12/2018 | Estrada et al. | |
| 10,192,107 B2 * | 1/2019 | Yu | G06T 7/174 |
| 10,628,961 B2 * | 4/2020 | Sundaresan | G06T 7/74 |
| 2019/0156496 A1 | 5/2019 | Leduc | |
| 2019/0236394 A1 | 8/2019 | Price et al. | |

OTHER PUBLICATIONS

Niu et al., "Multi-Modal Multi-Scale Deep Learning for Large-Scale Image Annotation," arxiv.org, Oct. 19, 2018, pp. 1-11.

* cited by examiner

700

GENERATE ONE OR MORE OBJECT TRACKERS FOR TRACKING AT LEAST ONE OBJECT DETECTED FROM ON ONE OR MORE IMAGES
702

GENERATE ONE OR MORE BLOBS FOR THE AT LEAST ONE OBJECT BASED ON TRACKING MOTION ASSOCIATED WITH THE AT LEAST ONE OBJECT FROM THE ONE OR MORE IMAGES
704

GENERATE ONE OR MORE TRACKLETS FOR THE AT LEAST ONE OBJECT BASED ON ASSOCIATING THE ONE OR MORE OBJECT TRACKERS AND THE ONE OR MORE BLOBS, THE ONE OR MORE TRACKLETS INCLUDING ONE OR MORE SCALES OF OBJECT TRACKING DATA FOR THE AT LEAST ONE OBJECT
706

DETERMINE ONE OR MORE UNCERTAINTY METRICS BASED ON THE ONE OR MORE OBJECT TRACKERS AND AN EMBEDDING OF THE ONE OR MORE TRACKLETS
706

GENERATE A TRAINING MODULE FOR TRACKING THE AT LEAST ONE OBJECT USING THE EMBEDDING AND THE ONE OR MORE UNCERTAINTIES
706

FIG. 7

MULTI-SPATIAL SCALE ANALYTICS

CROSS-REFERENCES TO RELATED APPLICATIONS

This application claims the benefit of U.S. Provisional Application No. 62/847,242, filed May 13, 2019, which is hereby incorporated by reference, in its entirety and for all purposes.

TECHNICAL FIELD

The subject matter of this disclosure relates in general to the field of deep learning (DL) and artificial neural network (ANN). More specifically, example aspects are directed to multi-spatial scale analytics for object detection and/or object recognition.

BACKGROUND

Machine learning techniques are known for collecting and analyzing data from different devices for various purposes. Monitoring systems which rely on information from a large number of sensors face many challenges in assimilating the information and analyzing the information. For instance, an operating center or control room for monitoring a school, a city, or a national park for potential threats may use video feeds from a large number of video sensors deployed in the field. Analyzing these feeds may largely rely on manual identification of potential threats. Sometimes multiple feeds streamed in to a control or operations room may be monitored by a small number of individuals. The quality of these streams may not be of high definition or captured at a high frames per second (FPS) speed due to cost and energy considerations for the sensors, bandwidth limitations, etc., e.g., for battery powered or solar powered sensors deployed in an Internet of Things (IoT) environment.

Thus, the monitoring system may not be sufficiently detailed to reveal small objects, small variations, etc., to the human eye, especially at long ranges from the sensors. Critical information can also be missed if personnel responsible for monitoring the video feed are tired, on a break, etc. There is a need for autonomous object detection and object recognition techniques which can effectively address these and other related challenges.

BRIEF DESCRIPTION OF THE DRAWINGS

In order to describe the manner in which the above-recited and other advantages and features of the disclosure can be obtained, a more particular description of the principles briefly described above will be rendered by reference to specific embodiments thereof which are illustrated in the appended drawings. Understanding that these drawings depict only exemplary embodiments of the disclosure and are not therefore to be considered to be limiting of its scope, the principles herein are described and explained with additional specificity and detail through the use of the accompanying drawings in which:

FIG. 7 is a flowchart illustrating a process of multi-spatial scale object detection, in accordance with some examples.

DETAILED DESCRIPTION

Figure 1:
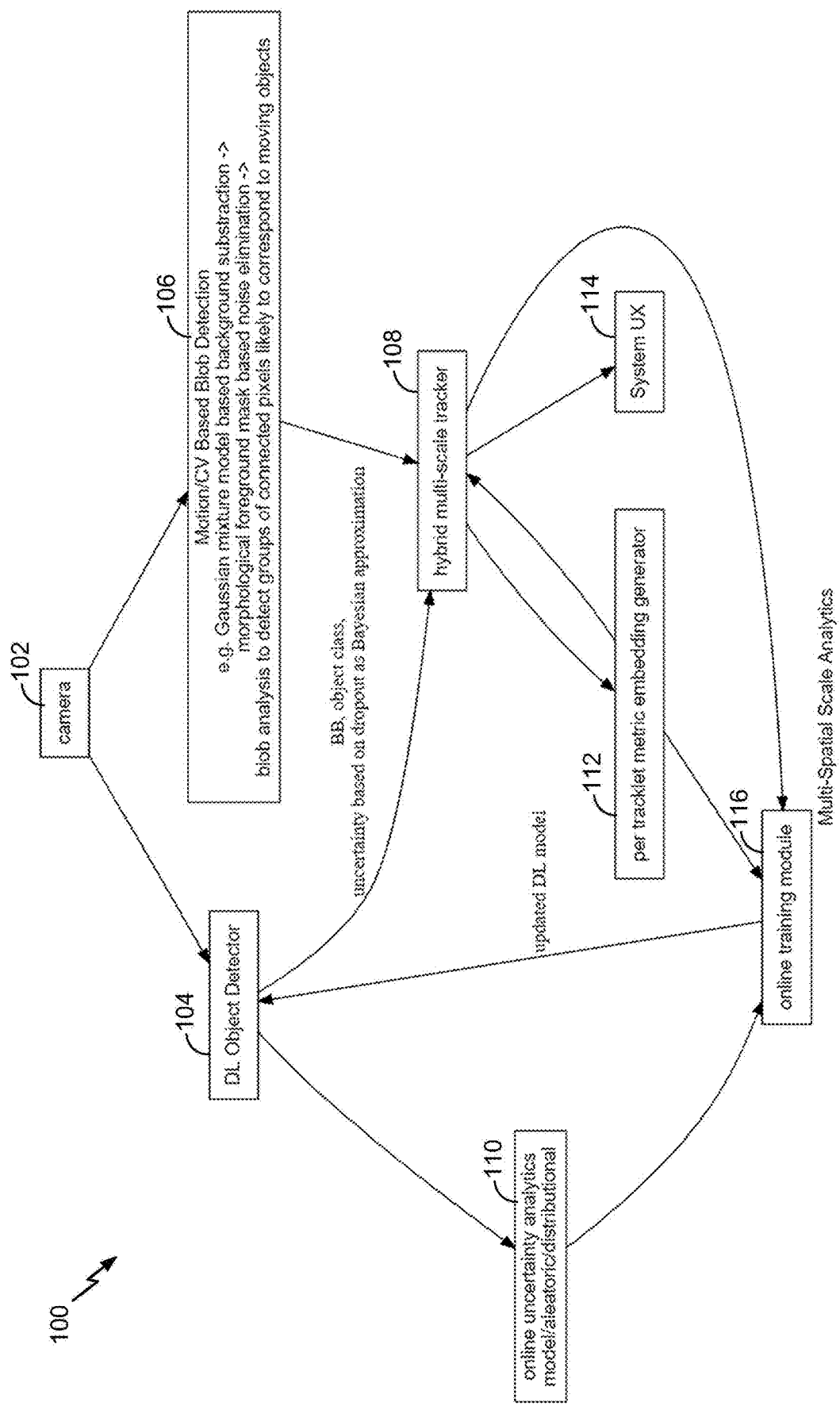
FIG. 1 illustrates an implementation of a multi-spatial analytics system in accordance with some examples.

Various embodiments of the disclosure are discussed in detail below. While specific implementations are discussed, it should be understood that this is done for illustration purposes only. A person skilled in the relevant art will recognize that other components and configurations may be used without parting from the spirit and scope of the disclosure.

Overview

Additional features and advantages of the disclosure will be set forth in the description which follows, and in part will be obvious from the description, or can be learned by practice of the herein disclosed principles. The features and advantages of the disclosure can be realized and obtained by means of the instruments and combinations particularly pointed out in the appended claims. These and other features of the disclosure will become more fully apparent from the following description and appended claims, or can be learned by the practice of the principles set forth herein.

Disclosed herein are systems, methods, and computer-readable for multi-spatial scale object detection, which include generating one or more object trackers for tracking at least one object detected from on one or more images (where the one or more images can include still images or video frames). One or more blobs are generated for the at least one object based on tracking motion associated with the at least one object. One or more sequences of detections belonging to the same object will be designated as tracklets and generated for the at least one object based on associating the one or more object trackers and the one or more blobs, the one or more tracklets including one or more scales of object tracking data for the at least one object. One or more uncertainty metrics are generated based on the one or more object trackers and an embedding of the one or more tracklets. A training module for tracking the at least one object using the embedding and the one or more uncertainty metrics is generated using deep learning techniques.

In some examples, a method is provided. The method includes generating one or more object trackers for tracking at least one object detected from on one or more images; generating one or more blobs for the at least one object based on tracking motion associated with the at least one object from the one or more images; generating one or more tracklets for the at least one object based on associating the one or more object trackers and the one or more blobs, the one or more tracklets including one or more scales of object tracking data for the at least one object; determining one or more uncertainty metrics based on the one or more object trackers and an embedding of the one or more tracklets; and generating a training module for tracking the at least one object using the embedding and the one or more uncertainty metrics.

In some examples, a system is provided. The system, comprises one or more processors; and a non-transitory computer-readable storage medium containing instructions which, when executed on the one or more processors, cause the one or more processors to perform operations including: generating one or more object trackers for tracking at least one object detected from on one or more images; generating one or more blobs for the at least one object based on tracking motion associated with the at least one object from the one or more images; generating one or more tracklets for the at least one object based on associating the one or more object trackers and the one or more blobs, the one or more tracklets including one or more scales of object tracking data for the at least one object; determining one or more uncertainty metrics based on the one or more object trackers and an embedding of the one or more tracklets; and generating a training module for tracking the at least one object using the embedding and the one or more uncertainty metrics.

In some examples, a non-transitory machine-readable storage medium is provided, including instructions configured to cause a data processing apparatus to perform operations including: generating one or more object trackers for tracking at least one object detected from on one or more images; generating one or more blobs for the at least one object based on tracking motion associated with the at least one object from the one or more images; generating one or more tracklets for the at least one object based on associating the one or more object trackers and the one or more blobs, the one or more tracklets including one or more scales of object tracking data for the at least one object; determining one or more uncertainty metrics based on the one or more object trackers and an embedding of the one or more tracklets; and generating a training module for tracking the at least one object using the embedding and the one or more uncertainty metrics.

In some examples of the methods, systems, and non-transitory machine-readable storage media, generating the training module comprises generating one or more ground truths for a deep learning model for object detection.

Some examples of the methods, systems, and non-transitory machine-readable storage media further comprise detecting the at least one object from the one or more images using the deep learning model.

Some examples of the methods, systems, and non-transitory machine-readable storage media further comprise detecting one or more blobs associated with the at least one object based on determining one or more dimensions associated the at least one object, using the one or more ground truths.

In some examples of the methods, systems, and non-transitory machine-readable storage media, generating the one or more blobs for the at least one object based on tracking motion associated with the at least one object comprises: performing a background subtraction on the one or more images; generating a morphological foreground mask based on the background subtraction; and performing a connected component analysis to identify the one or more blobs.

In some examples of the methods, systems, and non-transitory machine-readable storage media, generating one or more tracklets for the at least one object based on associating the one or more object trackers and the one or more blobs comprises: performing a cost analysis on the one or more object trackers and the one or more blobs; and associating data corresponding to the one or more object trackers and the one or more blobs based on the cost analysis.

In some examples of the methods, systems, and non-transitory machine-readable storage media, the one or more uncertainty metrics comprise one or more of a model uncertainty, data uncertainty, or distributional uncertainty.

This overview is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

Description of Example Embodiments

Disclosed herein are systems, methods, and computer-readable media for multi-spatial scale analytics. In some examples, statistical learning techniques (e.g., machine learning (ML), deep learning (DL), etc.) are disclosed for analyzing implicitly correlated data for improving object detection and object recognition. In some examples, automatic ground truth generation, labeling, and self-calibration techniques are used for fully or partially unsupervised manner. In some examples, automatic scale detection is used to improve object recognition accuracy. In some examples, high confidence object detections may be combined with known object size ranges (e.g. human head size ranges) to compute perspective distortion compensation parameters. The computed perspective distortion compensation parameters may be combined with object tracking algorithms to enable auto-generation of accurate ground truth for very small object detection based on minimal spatial size (e.g., as low as a few pixels).

In photography and cinematography, perspective distortion includes a warping or transformation of an object and its surrounding area that differs significantly from what the object would look like with a normal focal length, due to the relative scale of nearby and distant features. Perspective distortion is determined by the relative distances at which the image is captured and viewed, and is due to the angle of view of the image (as captured) being either wider or narrower than the angle of view at which the image is viewed, hence the apparent relative distances differing from what is expected.

For example, a video feed from a camera or sensor in a field may have a view spanning a large distance, which means that due to perspective distortions in a far field of the image, even a large object such as an elephant may occupy only a small spatial size, such as 10 pixels high and wide. Object detection in such small spatial sizes for smaller objects such as humans is a challenge.

According to some examples, automatic ground truth generation techniques can be used for object detection and recognition even at these small spatial scales. For example, considering a view of a road going off into the distance, an object such as a human near the bottom of the screen (i.e., close to the camera) can reveal a model of a human body. For example, a human model can include a function of height of the image of the human and the number of pixels occupied in the vertical direction. In some examples, this function can be used for automatic ground truth generation in learning techniques for object detection/recognition of a human model, even at a long distance.

In an example, based on heuristics a range of human sizes may be used in the ground truth detection. Even though heights may vary from children to adults and across different humans, it is recognized that humans have consistent and proportional head sizes. Accordingly, head sizes can be used for automatic calibration of deep learning models without prior knowledge. As video feeds from the camera are analyzed, a deep learning model according to this invention can self-calibrate based on the detection of humans in the zone where there is high accuracy (e.g., in the bottom of the screen).

In some examples, a blob or a bounding box may be applied to determine the number of pixels corresponding to the human. As the human moves away and appears towards the middle of the screen or towards the top of the screen, the perspective distortion leads to reduced accuracy. However, filters may be applied based on the ground truth and the function between the height of the bounding box and the number of pixels, to filter out non-humans and false positives in this example.

In some examples, different bounding boxes for different objects being tracked can be used to train an object detection model. Confidence values can be adjusted for objects based on several factors. For example, a confidence value can be based on the position or location of an object detected on a the screen (e.g., bottom of the screen is closest and has the highest confidence to provide ground truth; middle of the screen is further away with lower confidence, and top of the screen is furthest away, with the least confidence). When objects in bounding boxes are detected at high confidence, the objects can be labeled automatically. In this manner the labeling and ground truth generation can be automatic.

FIG. 1 illustrates a multi-spatial analytics system 100. In some examples, the system 100 can be configured for automatic object detection and recognition using automatic ground truth generation. In some examples, the system 100 can implement various unsupervised machine learning techniques for automatically identifying and tracking objects using a combination of one or more online learning engines. FIG. 1 provides a broad overview of example components of the system 100. A detailed discussion of the various functional blocks illustrated in FIG. 1 will be provided in the following sections.

In some examples, the system 100 can obtain images from one or more cameras such as a camera 102. In this disclosure, the term "images" can include still images, video frames, or other. For example, references to one or more images can include one or more still images and/or one or more video frames. For example, the system 100 can obtain one or more images including still images, video frames, or other types of image information from the camera 102. In some examples, the camera 102 can include an Internet protocol camera (IP camera) or other video capture device for providing a sequence of picture or video frames. An IP camera is a type of digital video camera that can be used for surveillance, home security, or other suitable application. Unlike analog closed circuit television (CCTV) cameras, an IP camera can send and receive data via a computer network and the Internet. In some instances, one or more IP cameras can be located in a scene or an environment, and can remain static while capturing video sequences of the scene or environment.

In some examples, the camera 102 can be used to send and receive data via a computer network implemented by the system 100 and/or the Internet. In some cases, IP camera systems can be used for two-way communications. For example, data (e.g., audio, video, metadata, or the like) can be transmitted by an IP camera using one or more network cables or using a wireless network, allowing users to communicate with what they are seeing. One or more remote commands can also be transmitted for pan, tilt, zoom (PTZ) of the camera 102. In some examples, the camera 102 can support distributed intelligence. For example, one or more analytics can be placed in the camera 102 itself, while some functional blocks of the system 100 can connect to the camera 102 through one or more networks. In some examples, one or more alarms for certain events can be generated based on analyzing the images obtained from the camera 102. A system user interface (UX) 114 can connect to a network to obtain analytics performed from the camera 102, output an alarm generated, and/or manipulate the camera 102, among other features.

In some examples, the analytics performed by the system 102 can include immediate detection of events of interest as well as support for analysis of pre-recorded video or images obtained from the camera 102 for the purpose of extracting events in a long period of time, as well as many other tasks. In some examples, the system 102 can operate as an intelligent video motion detector by detecting moving objects and by tracking moving objects. In some cases, the system 102 can generate and display a bounding box around a valid object. The system 102 can also act as an intrusion detector, a video counter (e.g., by counting people, objects, vehicles, or the like), a camera tamper detector, an object left detector, an object/asset removal detector, an asset protector, a loitering detector, and/or as a slip and fall detector. The system 102 can further be used to perform various types of recognition functions, such as face detection and recognition, license plate recognition, object recognition (e.g., animals, birds, vehicles, or the like), or other recognition functions. In some cases, video analytics can be trained to recognize certain objects using user input or supervised learning functions. In some instances, event detection can be performed including detection of fire, smoke, fighting, crowd formation, or any other suitable event the system 102 is programmed to or learns to detect. A detector can trigger the detection of an event of interest and can send an alert or alarm to a central control room to alert a user of the event of interest, such as the system UX 114. The various functional blocks of the system 100 will now be described in further detail with reference to the figures.

Figure 2:
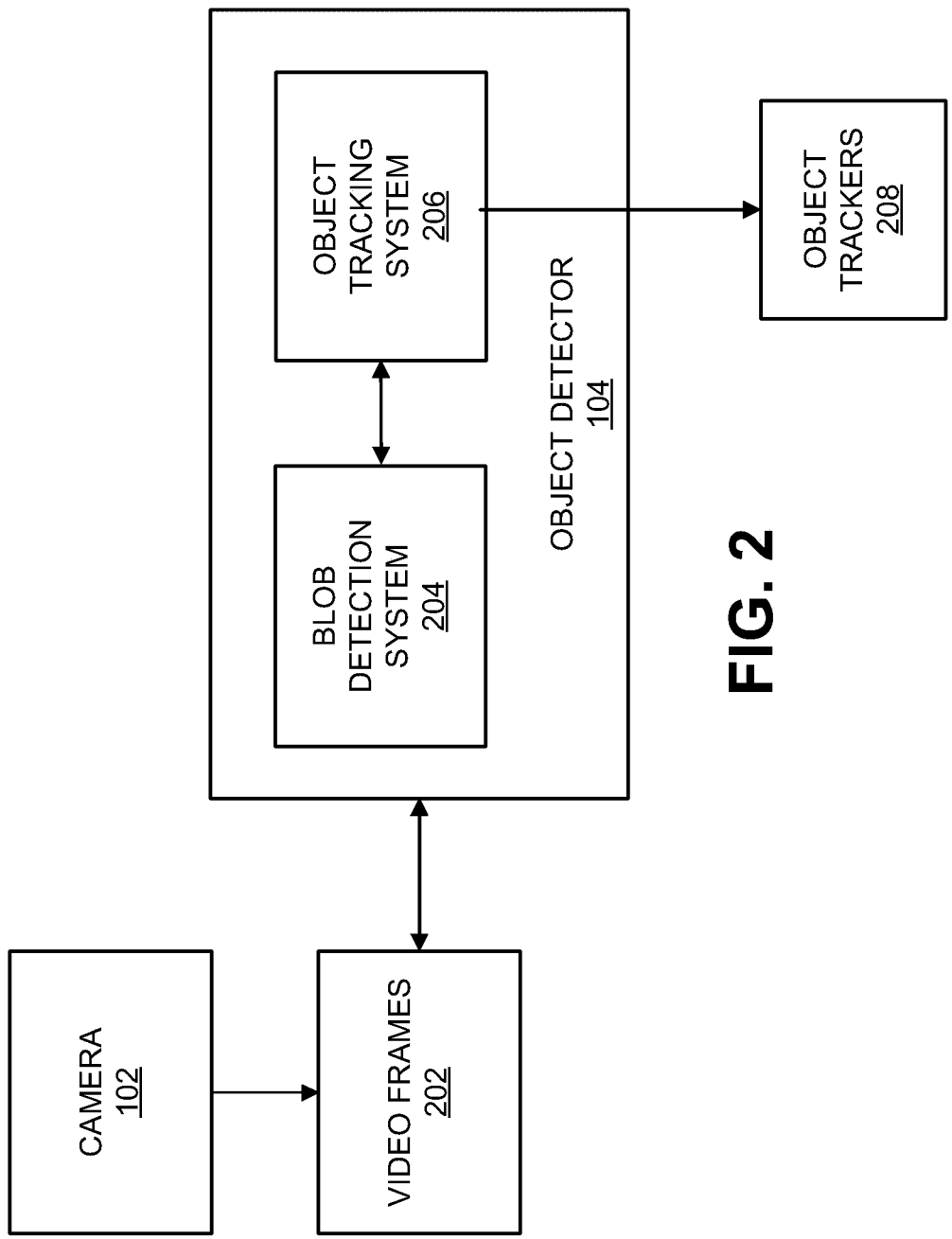
FIG. 2 illustrates an implementation of an object detector, in accordance with some examples.

FIG. 2 is a block diagram illustrating an example implementation of an object detector 104. In some examples, the object detector 104 can implement deep learning (DL) techniques for object detection, and will be referred to as a DL object detector in some examples. Example deep learning techniques will be discussed in further detail with reference to FIGS. 6-7. The object detector 104 can receive video frames 202 from the camera 102 or another video source. The video frames 102 can also be referred to herein as a video picture or a picture.

The object detector 104 can include a blob detection system 204 and an object tracking system 206. Object detection and tracking allows the object detector 104 to provide, for example, intelligent motion detection, intrusion detection, and other features such as people, vehicle, or other object counting and classification. The blob detection system 204 can detect one or more blobs in video frames (e.g., video frames 202) of a video sequence, and the object tracking system 206 can track the one or more blobs across the frames of the video sequence. As used herein, a blob refers to foreground pixels of at least a portion of an object (e.g., a portion of an object or an entire object) in a video frame. For example, a blob can include a contiguous group of pixels making up at least a portion of a foreground object in a video frame. In another example, a blob can refer to a contiguous group of pixels making up at least a portion of a background object in a frame of image data. A blob can also be referred to as an object, a portion of an object, a pixel patch, a cluster of pixels, or any other term referring to a group of pixels of an object or portion thereof. In some examples, a bounding box can be associated with a blob and the blobs can be tracked using blob trackers. A bounding region of a blob or tracker can include a bounding box, a bounding circle, a bounding ellipse, or any other suitably-shaped region representing a tracker and/or a blob. A bounding box associated with a tracker and/or a blob can have a rectangular shape, a square shape, or other suitable shape.

In some examples, a motion model for a blob tracker can determine and maintain two locations of the blob tracker for each frame. In some examples, the velocity of a blob tracker can include the displacement of a blob tracker between consecutive frames. Using the blob detection system 204 and the object tracking system 206, the object detector 104 can perform blob generation and detection for each frame or picture of a video sequence. For example, the blob detection system 204 can perform background subtraction for a frame, and can then detect foreground pixels in the frame. Foreground blobs are generated from the foreground pixels using morphology operations and spatial analysis.

In some examples, the object detector 104 can be used to detect (e.g., classify and/or localize) objects in one or more images using a trained classification network. For instance, the object detector 104 can apply a deep learning neural network (also referred to as deep networks and deep neural networks) to identify objects in an image based on past information about similar objects that the detector has learned based on training data (e.g., training data can include images of objects used to train the system). Any suitable type of deep learning network can be used, including convolutional neural networks (CNNs), autoencoders, deep belief nets (DBNs), Recurrent Neural Networks (RNNs), among others. One illustrative example of a deep learning network detector that can be used includes, but are not limited to, region proposal methods like R-FCN, which generate a set of candidates bounding boxes and then process each candidate in a two-stage pipeline. Other illustrative examples of deep learning network detector are proposal-free methods like Single Shot object Detector (SSD) and You Only Look Once (YOLO) detector, which consider each detection a regression problem. The YOLO detector can apply a single neural network to a full image, by dividing the image into regions and predicting bounding boxes and probabilities for each region. The bounding boxes are weighted by the predicted probabilities in a YOLO detector. Any other suitable deep network-based single-stage or two-stage detector can be used.

In some examples, supervised training models can be used to classify detected objects using labels. In some examples, ground truth for object detection can be provided to the object detector 104. In some examples, the object detector 104 can, in conjunction with one or more other function blocks of the system 100, be configured for automatic ground truth generation. In some examples, labeling or classifying can be performed using the automatically generated ground truth models in an unsupervised or semi-supervised learning model implemented by the object detector 104. The blob trackers or more generally, object trackers 208 generated by the object detector 104 can be used in conjunction with blob detection using a motion based blob detector in a hybrid tracker model, as explained with reference to FIGS. 3-4 below.

Figure 3:
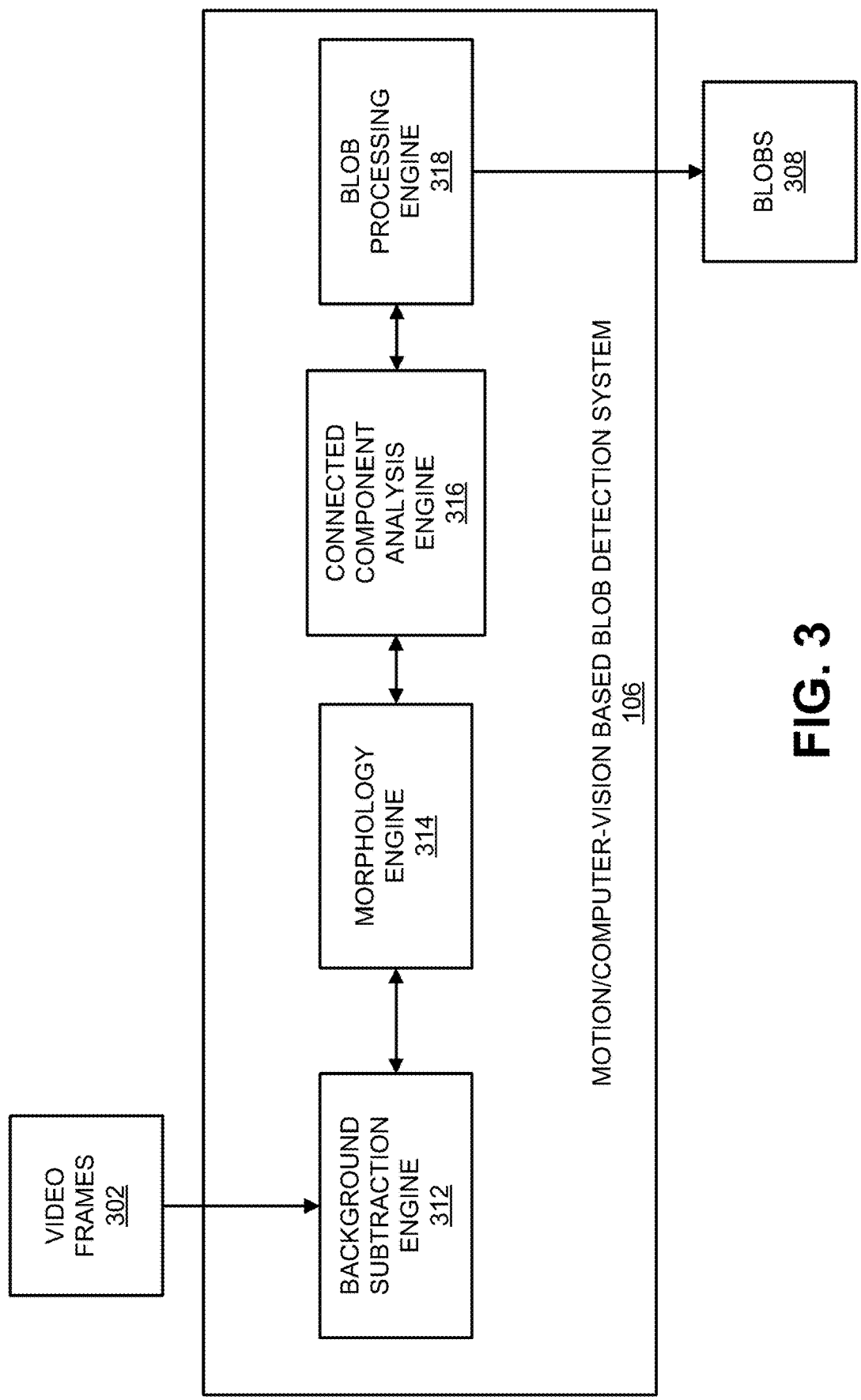
FIG. 3 illustrates an implementation of a blob detection system, in accordance with some examples.

FIG. 3 is a block diagram illustrating an example of a blob detection system 106. In some examples, the blob detection system 106 can implement motion based blob detection. In some examples, computer vision (CV) algorithms and approaches can aid in the motion based blob detection. In some examples, the blob detection system 106 may also be referred to as a motion/CV based blob detection system. The blob detection system 106 can implement background subtraction techniques to detect motion based on difference between frames. In some examples, the blob detection system 106 can generate blobs which can complement the blob trackers or object trackers generated by the object detector 104. For example, a motion based analysis may not reveal objects as clearly as a blob analysis by the object detector 104. However, the motion based blob detection can be implemented without significant training using the techniques further explained below.

In some examples, blob detection can be used to segment moving objects from the global background in a scene. The blob detection system 106 includes a background subtraction engine 312 that receives video frames 302 (e.g., obtained from the camera 102). The background subtraction engine 312 can perform background subtraction to detect foreground pixels in one or more of the video frames 302. For example, the background subtraction can be used to segment moving objects from the global background in a video sequence and to generate a foreground-background binary mask (referred to herein as a foreground mask). In some examples, the background subtraction can perform a subtraction between a current frame or picture and a background model including the background part of a scene (e.g., the static or mostly static part of the scene). Based on the results of background subtraction, the morphology engine 314 and connected component analysis engine 316 can perform foreground pixel processing to group the foreground pixels into foreground blobs for tracking purpose. For example, after background subtraction, morphology operations can be applied to remove noisy pixels as well as to smooth the foreground mask. Connected component analysis can then be applied to generate the blobs. Blob processing can then be performed, which may include further filtering out some blobs and merging together some blobs to provide bounding boxes as input for tracking.

The background subtraction engine 312 can model the background of a scene (e.g., captured in the video sequence) using any suitable background subtraction technique (also referred to as background extraction). One example of a background subtraction method used by the background subtraction engine 312 includes modeling the background of the scene as a statistical model based on the relatively static pixels in previous frames which are not considered to belong to any moving region. For example, the background subtraction engine 312 can use a Gaussian distribution model or a Gaussian Mixture model (GMM) to allow more complex multimodal background models, with parameters of mean and variance to model each pixel location in frames of a video sequence. All the values of previous pixels at a particular pixel location are used to calculate the mean and variance of the target Gaussian model for the pixel location. When a pixel at a given location in a new video frame is processed, its value will be evaluated by the current Gaussian distribution of this pixel location. A classification of the pixel to either a foreground pixel or a background pixel is done by comparing the difference between the pixel value and the mean of the designated Gaussian model.

The background subtraction techniques mentioned above are based on the assumption that the camera is mounted still, and if anytime the camera is moved or orientation of the camera is changed, a new background model may be calculated. There are also background subtraction methods that can handle foreground subtraction based on a moving background, including techniques such as tracking key points, optical flow, saliency, and other motion estimation based approaches.

The background subtraction engine 312 can generate a foreground mask with foreground pixels based on the result of background subtraction. Using the foreground mask generated from background subtraction, a morphology engine 314 can perform morphology functions to filter the foreground pixels and eliminate noise. The morphology functions can include erosion and dilation functions. An erosion function can be applied to remove pixels on object boundaries. A dilation operation can be used to enhance the boundary of a foreground object. In some examples, an erosion function can be applied first to remove noise pixels, and a series of dilation functions can then be applied to refine the foreground pixels.

After the morphology operations are performed, the connected component analysis engine 316 can apply connected component analysis to connect neighboring foreground pixels to formulate connected components and blobs that likely correspond to moving objects. In some implementations of connected component analysis, a set of bounding boxes are returned in a way that each bounding box contains one component of connected pixels. Some objects can be separated into different connected components and some objects can be grouped into the same connected components (e.g., neighbor pixels with the same or similar values). Additional processing may be applied to further process the connected components for grouping. Finally, the blobs 308 are generated that include neighboring foreground pixels according to one or more connected components.

The blob processing engine 318 can perform additional processing to further process the blobs generated by the connected component analysis engine 316. In some examples, the blob processing engine 318 can generate the bounding boxes to represent the detected blobs and blob trackers. In some cases, the blob bounding boxes can be output from the blob detection system 106. In some examples, there may be a filtering process for the connected components (bounding boxes). For instance, the blob processing engine 318 can perform content-based filtering of certain blobs. In some cases, a machine learning method can determine that a current blob contains noise (e.g., foliage in a scene). Using the machine learning information, the blob processing engine 318 can determine the current blob is a noisy blob and can remove it from the resulting blobs that are provided to the hybrid tracking system 108. Once the blobs are detected and processed, object tracking (also referred to as blob tracking) can be performed to track the detected blobs.

Figure 4:
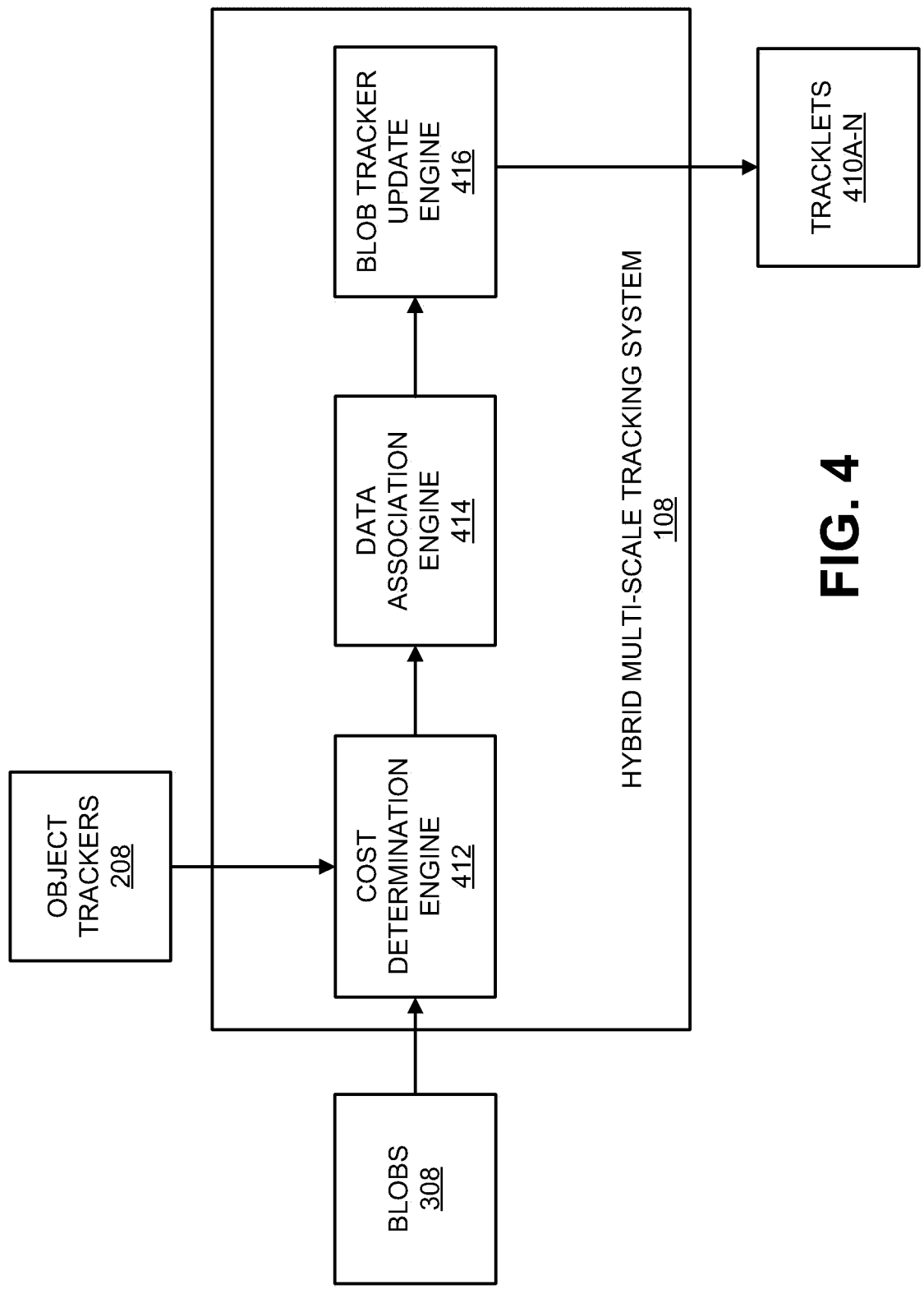
FIG. 4 illustrates an implementation of a hybrid tracking system, in accordance with some examples.

FIG. 4 is a block diagram illustrating an example of a hybrid tracking system 108. The hybrid tracking system 108 can obtain the blobs 308 generated from the blob detection system 106 and the object trackers 208 obtained from the object detector 104. In some cases, the hybrid tracking system 108 can use one or more functions to combine the information from the blob detection system 106 and the object detector 104 to enable object detection or identification which the individual systems may be unable to. For example, the size of an object which may have been recognized by an object tracker 208 when it was a first size (say 50 pixels for a given perspective distortion) may transition to a smaller second size (say 20 pixels for another perspective distortion as the object moves away from the camera 102). At the smaller second size the object detector 104 may be unable to perform object detection as the associated blob for the object may be too small. On the other hand, the object's motion may have been picked up by the blob detection system 106 even if the blob detection system 106 may be unable to identify the object at this small size. This is because the object's motion can be identified using the background subtraction engine 312 of the blob detection system 106 even for small sizes. In some examples, the hybrid tracking system 108 can use one or more of an object class, bounding boxes, or other input from the object detector 104 combined with the motion based blob detection from the blob detection system 106 to identify even these very small objects. Deep Learning techniques such as Monte-Carlo Dropout at test-time (MCDropout), can also be used as a Bayesian approximation for model uncertainty estimation and misspecification.

For example, when blobs (making up at least portions of objects) are detected from an input video frame, blob trackers from the previous video frame can be associated to the blobs in the input video frame according to a cost calculation. The blob trackers can be updated based on the associated foreground blobs. In some instances, the steps in object tracking can be conducted in a series manner. A cost determination engine 412 can obtain the blobs 308 of a current video frame and the object trackers 208 updated from the previous video frame and calculate costs between the object trackers 208 and the blobs 308. Any suitable cost function can be used to calculate the costs, such as, but not limited to, a Euclidean distance between the centroid of the tracker (e.g., the bounding box for the tracker) and the centroid of the bounding box of the foreground blob. Data association between trackers 208 and blobs 308, as well as updating of the trackers 208, may be based on the determined costs. The data association engine 414 matches or assigns a tracker (or tracker bounding box) with a corresponding blob (or blob bounding box) and vice versa. For example, the lowest cost tracker-blob pairs may be used by the data association engine 414 to associate the object trackers 208 with the blobs 308.

For example, an object tracked by the object trackers 208 can have one or more blobs associated with the same object based on different views which may have been observed of the same object. For example, an object such as a human or animal's profile, as viewed from different angles or viewpoints can have different shapes and sizes. With multiple views, sizes, and shapes of the same object being associated with the same object, it is possible to then identify the object based on any one of the views. For example, is multiple views of the same object have been tied together or embedded, then as the object's size becomes too small due to perspective distortion, for example, the object may still be recognized using the embedding (e.g., relationship between different views or shapes that an object can have) even if the object may be unidentifiable. Thus, the data association engine 414 can combine the different dimensions or scale of information for a same object. These different scales can include, for example, an object's various views, motion characteristics, blob sizes, perspectives, etc. Accordingly, the data association engine 414 of the hybrid tracking system 108 can enable the association of data in these different scales can be used for identifying and tracking the same object. In some cases, the hybrid tracking system 108 is also referred to as a hybrid multi-scale tracking system.

Once the association between the object trackers 208 and blobs 308 has been completed, the blob tracker update engine 416 can use the information of the associated blobs, as well as the trackers' temporal statuses, to update the status (or states) of the trackers for the current frame. The different trackers and their status or states are referred to as tracklets. The blob tracker update engine 416 can update multiple tracklets 410A-N, and perform object tracking using the updated tracklets 410A-N, and can also provide the updated tracklets 410A-N for use in processing a next frame. In some examples, the updating allows the hybrid tracking system 108 to determine whether a particular set or subset of tracklets have been previously encountered. For example, if a particular type of motion information was previously observed in a set of tracklets, then the hybrid tracking system 108 can update a learning model to classify the set of tracklets. For example, a specific motion characteristic of an object can be associated with a set of tracklets, where learning the set of tracklets can enable identifying the object using the set of tracklets even when the object may not be recognizable (e.g., may be too small to detect) using other object detection techniques.

In some examples, the per tracklet metric embedding generator 112 of FIG. 1 can obtain the various tracklets 410A-N from the hybrid tracking system 108 and generate an embedding for different sets of tracklets. For example, as previously explained, data associated with an object's identification can include tracking information in various scales. Embedding the tracklets for an object allows the development of tracking models for the object in different scales and also for conversion between the scales. For example, various data points associated with an object's tracking can be transformed to variables used for specific models. For example, statistical analysis such as a principal component analysis (PCA) can be used to perform an orthogonal transformation to convert a set of observations of possibly correlated variables (entities each of which takes on various numerical values) into a set of values of linearly uncorrelated variables called principal components. This transformation is defined in such a way that the first principal component has the largest possible variance (that is, accounts for as much of the variability in the data as possible), and each succeeding component in turn has the highest variance possible under the constraint that it is orthogonal to the preceding components. The resulting vectors (each being a linear combination of the variables and containing n observations) are mutually uncorrelated orthogonal basis set. Various other transformations can also be performed (e.g., hash functions) to simplify and reduce the amount of information to be studied by neural networks in developing the multi-spatial scale analysis in aspects of this disclosure.

As described above, the hybrid tracking system 108 can use motion-based object/blob detection and tracking can track moving objects detected as a set of blobs. Each blob does not necessarily correspond to an object. In addition, each blob may not necessarily correspond to a truly moving object. Since the motion detection is performed using background subtraction, the complexity of the solution may in some cases be based on the number of moving objects in the scene or other factors which can introduce uncertainties. For example, a solution may not be accurate in some scenarios. In some cases, inconsistent motion trajectory of an object can lead to missed detections. For example, a moving object can trigger a continuous set of detected blobs in successive video frames. These detections (as recorded by a history of blobs) serve as the initial motion trajectory of a candidate that can subsequently be considered as a tracked object (e.g., if the threshold duration is met, and/or other condition is met). However, there can be several causes for the trajectory not triggering a true positive object to be reported in the system. One cause can include that the trajectory is broken in one video frame, resulting in the whole object being removed. Illustrative reasons that the trajectory can be broken include bad lighting conditions that result in a failed object detection for one or more frames, an object becoming merged with another object and no longer contributing to an individual initial motion trajectory of an existing object, crossing trajectories, as well as various other reasons. Another cause for the trajectory not triggering a true positive object can include that the trajectory of an object does not appear to resemble a typical moving object, such as when movement associated with the initial motion trajectory is small, when the blob sizes associated with the initial motion trajectory are quite inconsistent, among other cases.

Figure 5:
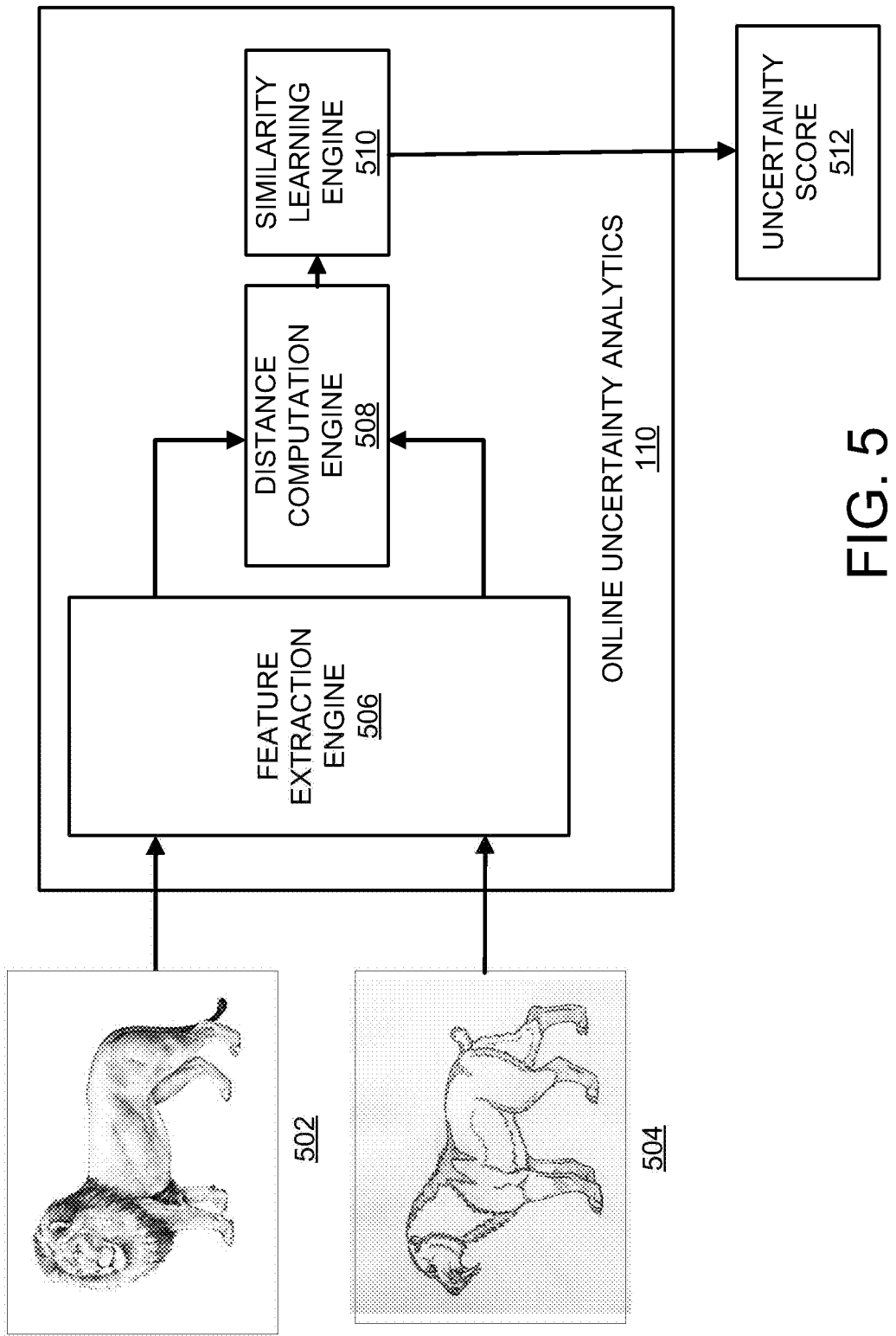
FIG. 5 illustrates an implementation of an online uncertainty analytics system, in accordance with some examples.

FIG. 5 is a diagram illustrating an example of an online uncertainty analytics system 110 that can identify the level of mismatch between a model which includes the tracklets for an object and potential deviations in a real time identification of an object. For example, the identification of an object using the object detector 104 can be correlated with the tracklets or model which has been generated for the object to determine whether there has been a false positive, a false negative, or other inconsistencies between the motion-based object/blob detection and tracking models. Such inconsistencies can be due to an incorrectly generated model, aleatoric (e.g., intrinsic or stochastic) uncertainties in the system 100, distributional (e.g., statistical or training information) uncertainties, etc.

In some examples, the online uncertainty analytics system 110 can determine similarities, dissimilarities, and/or uncertainties in tracking information and models in real time. For example, a model of an object generated by the hybrid tracking system 108 using several tracklets 408A-N can be correlated to the object trackers 208 generated by the object detector 104. In some examples where the object detector 104 employs deep learning techniques, there can be related uncertainties as training of object detection models can change.

The online uncertainty analytics system 110 can have various components, including a feature extraction engine 506, a distance computation engine 508 (e.g., stochastic distance), and a similarity learning engine 510. In an illustrative example, the feature extraction engine 506 can extract features from two images 502 and 504 for an object as obtained from the camera 102 and analyzed by the object detector 104, for example. The distance computation engine 508 can compute a distance between two objects (e.g., different views of the same or a different animal) represented in the images, and the similarity learning engine 510 can learn similarities (between feature distances and the matching labels) to enable object verification. The output from the similarity learning engine 510 includes a similarity score 512, indicating a similarity between two objects represented in the images 502 and 504. The image 502 can include an input image received at runtime from a capture device, for example an image of a lion detected by the object detector 104, and the image 504 can include an image of a lion generated from a database of known objects whose motion based characteristics match those of the object's motion characteristics. An uncertainty score 512 can be generated based on how well the similarity learning engine 510 performs over time. For example, if there are significant mismatches, the uncertainty score may be higher, whereas predictions which tend to be more closely correlated can have lower uncertainties. The uncertainty scores can also be relative to the type of uncertainty (e.g., model, data, distributional, etc.) and each type of uncertainty can have its own associated score.

Referring back to FIG. 1, an online training module 116 can track the performance of the system 100 and provide updates to the various systems and functional blocks real time. In some examples, the online training module 116 can generate one or more ground truths for a deep learning model to be used for tracking the at least one object, based on the embedded tracklets, the one or more uncertainty metrics, and other factors. For example, the uncertainty score 512, in combination with the set of embedded tracklets from the per tracklet metric embedding generator 112 can be correlated. If training data provided by the tracklets are identified to be ineffective in reducing uncertainty for a particular situation, for example, the object detector 104 can be determined to be ineffective or malfunctioning. In other examples, the object detector 104 can be updated to improve its training data using the embedded metrics. For example, based on an embedding of the various view of an object, the object detector 104's training data can be updated with the ground truths and the other updates to be able to detect an object which was previously being incorrectly identified. The automatic ground truth generation can enable partially or fully unsupervised learning by the system 100 for multi-spatial scale object detection.

Figure 6:
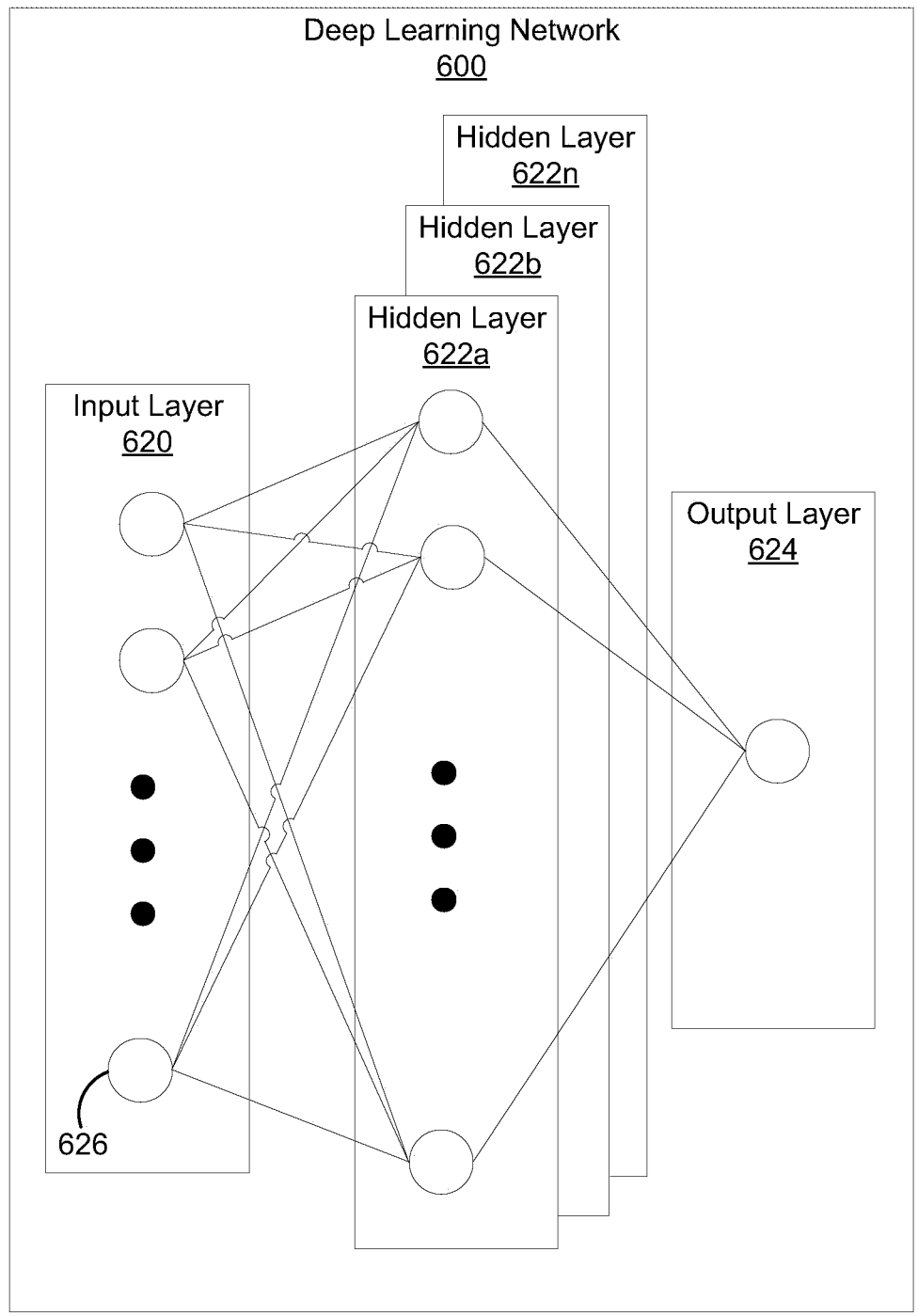
FIG. 6 illustrates a deep learning neural network, in accordance with some examples.

FIG. 6 is an illustrative example of a deep learning neural network 600 that can be used by the object detector 104. An input layer 620 includes input data. In one illustrative example, the input layer 620 can include data representing the pixels of an input video frame. The deep learning neural network 600 includes multiple hidden layers 622a, 622b, through 622n. The hidden layers 622a, 622b, through 622n include "n" number of hidden layers, where "n" is an integer greater than or equal to one. The number of hidden layers can be made to include as many layers as needed for the given application. The deep learning neural network 600 further includes an output layer 624 that provides an output resulting from the processing performed by the hidden layers 622a, 622b, through 622n. In one illustrative example, the output layer 624 can provide a classification and/or a localization for an object in an input video frame. The classification can include a class identifying the type of object (e.g., a human, a lion, a vehicle, or other object) and the localization can include a bounding box indicating the location of the object.

The deep learning neural network 600 is a multi-layer neural network of interconnected nodes. Each node can represent a piece of information. Information associated with the nodes is shared among the different layers and each layer retains information as information is processed. In some cases, the deep learning neural network 600 can include a feed-forward network, in which case there are no feedback connections where outputs of the network are fed back into itself. In some cases, the deep learning neural network 600 can include a recurrent neural network, which can have loops that allow information to be carried across nodes while reading in input.

Information can be exchanged between nodes through node-to-node interconnections between the various layers. Nodes of the input layer 620 can activate a set of nodes in the first hidden layer 622a. For example, as shown, each of the input nodes of the input layer 620 is connected to each of the nodes of the first hidden layer 622a. The nodes of the hidden layer 622 can transform the information of each input node by applying activation functions to these information. The information derived from the transformation can then be passed to and can activate the nodes of the next hidden layer 622b by a non-linear activation function, which can perform their own designated functions. Example functions include convolutional, up-sampling, data transformation, and/or any other suitable functions. The output of the hidden layer 622b can then activate nodes of the next hidden layer, and so on. The output of the last hidden layer 622n can activate one or more nodes of the output layer 624, at which an output is provided. In some cases, while nodes (e.g., node 626) in the deep learning neural network 600 are shown as having multiple output lines, a node has a single output and all lines shown as being output from a node represent the same output value.

In some cases, each node or interconnection between nodes can have a weight that is a set of parameters derived from the training of the deep learning neural network 600. For example, an interconnection between nodes can represent a piece of information learned about the interconnected nodes. The interconnection can have a tunable numeric weight that can be tuned (e.g., based on a training dataset), allowing the deep learning neural network 600 to be adaptive to inputs and able to learn as more and more data is processed.

The deep learning neural network 600 is pre-trained to process the features from the data in the input layer 620 using the different hidden layers 622a, 622b, through 622n in order to provide the output through the output layer 624. In an example in which the deep learning neural network 600 is used to identify objects in images, the deep learning neural network 600 can be trained using training data that includes both images and labels. For instance, training images can be input into the network, with each training image having a label indicating the classes of the one or more objects in each image (basically, indicating to the network what the objects are and what features they have).

In some cases, the deep learning neural network 600 can adjust the weights of the nodes using a training process called backpropagation. Backpropagation can include a forward pass, a loss function, a backward pass, and a weight update. The forward pass, loss function, backward pass, and parameter update is performed for one training iteration. The process can be repeated for a certain number of iterations for each set of training images until the network 1500 is trained well enough so that the weights of the layers are accurately tuned.

For the example of identifying objects in images, the forward pass can include passing a training image through the deep learning neural network 600. The weights are initially randomized before the deep learning neural network 600 is trained. The image can include, for example, an array of numbers representing the pixels of the image. Each number in the array can include a value from 0 to 255 describing the pixel intensity at that position in the array.

For a first training iteration for the deep learning neural network 600, the output will likely include values that do not give preference to any particular class due to the weights being randomly selected at initialization. For example, if the output is a vector with probabilities that the object includes different classes, the probability value for each of the different classes may be equal or at least very similar (e.g., for ten possible classes, each class may have a probability value of 0.1). With the initial weights, the deep learning neural network 600 is unable to determine low level features and thus cannot make an accurate determination of what the classification of the object might be. A loss function can be used to analyze error in the output. Any suitable loss function definition can be used. One example of a loss function includes a mean squared error (MSE). The loss (or error) will be high for the first training images since the actual values will be much different than the predicted output. The goal of training is to minimize the amount of loss so that the predicted output is the same as the training label. The deep learning neural network 600 can perform a backward pass by determining which inputs (weights) most contributed to the loss of the network, and can adjust the weights so that the loss decreases and is eventually minimized.

A derivative of the loss with respect to the weights can be computed to determine the weights that contributed most to the loss of the network. After the derivative is computed, a weight update can be performed by updating all the weights of the filters. The deep learning network 600 can include any suitable deep network. One example includes a convolutional neural network (CNN), which includes an input layer and an output layer, with multiple hidden layers between the input and out layers. The hidden layers of a CNN include a series of convolutional, nonlinear, pooling (for downsampling), and fully connected layers. The deep learning neural network 600 can include any other deep network element other than a CNN, such as a multi-layer perceptron (MLP), Recurrent Neural Networks (RNNs), among others.

FIG. 7 illustrates a process 700 for multi-spatial scale analytics, including object detection. For example, the process 700 can be implemented in the system 100.

At step 702, the process 700 can include generating one or more object trackers for tracking at least one object detected from on one or more images. For example, the object detector 104 can detect the at least one object from the one or more images obtained from the camera 102 using the deep learning model. In some examples, the object detector can detect one or more blobs associated with the at least one object based on determining one or more dimensions associated the at least one object, using the one or more ground truths for a deep learning model for object detection. In some examples, the ground truths can be automatically generated by the online training module 116. In some examples, the object detection can be based on determining one or more dimensions (e.g., blob sizes) associated the at least one object, using the one or more ground truths.

At step 704, the process 700 can include generating one or more blobs for the at least one object based on tracking motion associated with the at least one object from the one or more images. For example, the blob detection system 106 can detect one or more blobs based on the motion information associated with the at least one object. For example, the background subtraction engine 312 of the blob detection system 106 can perform a background subtraction on the one or more images. The morphology engine 314 can generate a morphological foreground mask based on the background subtraction, and the connected component analysis engine 316 can perform a connected component analysis to identify the one or more blobs 308 by the blob detection system 106.

At step 706, the process 700 can include generating one or more tracklets for the at least one object based on associating the one or more object trackers and the one or more blobs, the one or more tracklets including one or more scales of object tracking data for the at least one object. For example, the cost determination engine 412 of the hybrid tracking system 106 can perform a cost analysis on the one or more object trackers and the one or more blobs and the data association engine 414 can associate data corresponding to the one or more object trackers and the one or more blobs based on the cost analysis. The hybrid tracking system 106 can generate one or more tracklets 410A-N using the blob tracker update engine 416.

At step 708, the process 700 can include determining one or more uncertainty metrics based on the one or more object trackers and an embedding of the one or more tracklets. For example, the online uncertainty analytics system 110 can generate one or more uncertainty scores 512 using one or more images 502, 504, a feature extraction engine 506, a distance computation engine 508, and a similarity learning engine 510. The per tracklet metric embedding generator 112 can generate the embedding of the one or more tracklets.

At step 710, the process 700 can include generating a training module for tracking the at least one object using the embedding and the one or more uncertainty metrics. For example, the online training module 116 can generate one or more ground truths for the deep learning model for object detection or other training module for tracking the at least one object using the embedding from the per tracklet metric embedding generator 112 and the one or more uncertainty scores 512.

In some examples, the training model, the embedding, the tracklets, and/or other information can be provided to a system UX 114, and in some examples, user input can be received for the training data or other information from the system UX 114.

Figure 8:
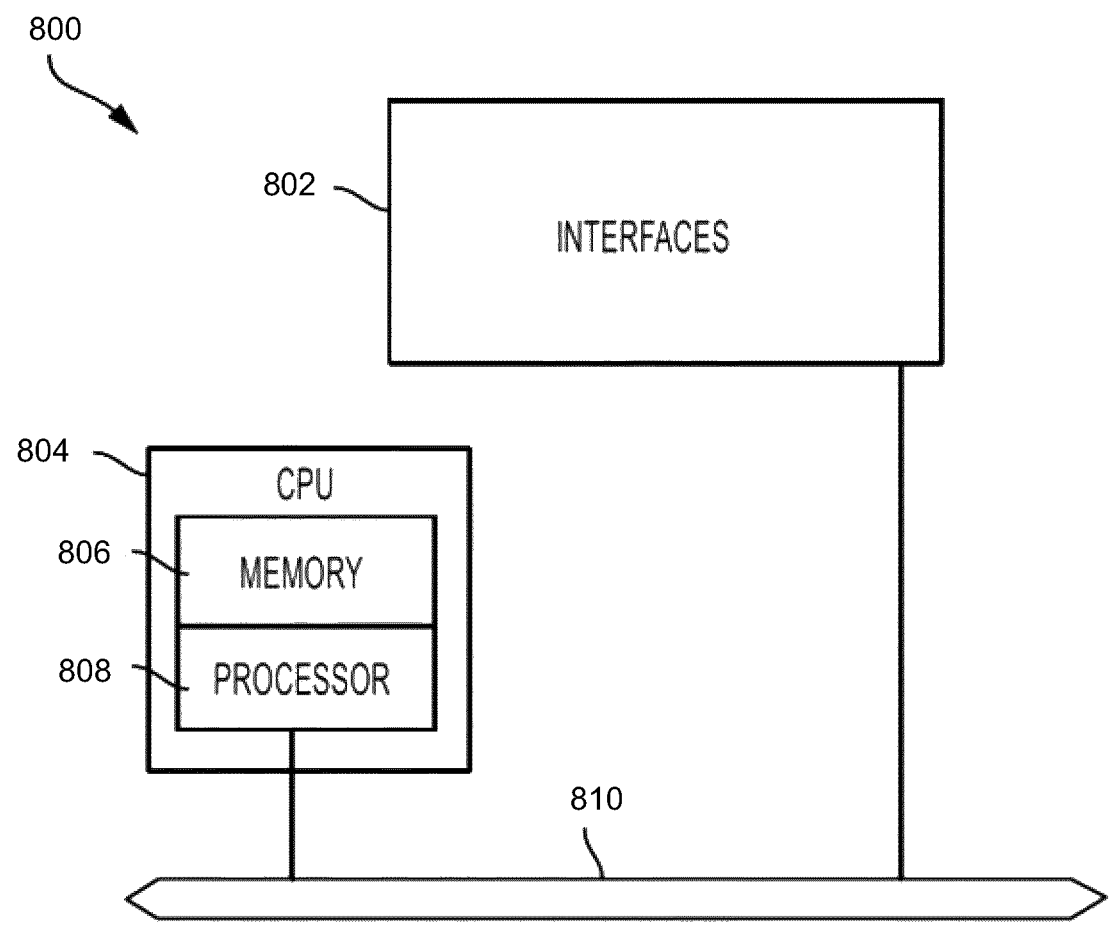
FIG. 8 illustrates a network device, in accordance with some examples.

FIG. 8 illustrates an example network device 800 suitable for implementing the aspects according to this disclosure. In some examples, the functional blocks of the system 100 discussed above, or others discussed in example systems may be implemented according to the configuration of the network device 800. The network device 800 includes a central processing unit (CPU) 804, interfaces 802, and a connection 810 (e.g., a PCI bus). When acting under the control of appropriate software or firmware, the CPU 804 is responsible for executing packet management, error detection, and/or routing functions. The CPU 804 preferably accomplishes all these functions under the control of software including an operating system and any appropriate applications software. The CPU 804 may include one or more processors 808, such as a processor from the INTEL X86 family of microprocessors. In some cases, processor 808 can be specially designed hardware for controlling the operations of the network device 800. In some cases, a memory 806 (e.g., non-volatile RAM, ROM, etc.) also forms part of the CPU 804. However, there are many different ways in which memory could be coupled to the system.

The interfaces 802 are typically provided as modular interface cards (sometimes referred to as "line cards"). Generally, they control the sending and receiving of data packets over the network and sometimes support other peripherals used with the network device 800. Among the interfaces that may be provided are Ethernet interfaces, frame relay interfaces, cable interfaces, DSL interfaces, token ring interfaces, and the like. In addition, various very high-speed interfaces may be provided such as fast token ring interfaces, wireless interfaces, Ethernet interfaces, Gigabit Ethernet interfaces, ATM interfaces, HSSI interfaces, POS interfaces, FDDI interfaces, WIFI interfaces, 3G/4G/5G cellular interfaces, CAN BUS, LoRA, and the like. Generally, these interfaces may include ports appropriate for communication with the appropriate media. In some cases, they may also include an independent processor and, in some instances, volatile RAM. The independent processors may control such communications intensive tasks as packet switching, media control, signal processing, crypto processing, and management. By providing separate processors for the communications intensive tasks, these interfaces allow the CPU 804 to efficiently perform routing computations, network diagnostics, security functions, etc.

Although the system shown in FIG. 8 is one specific network device of the present technologies, it is by no means the only network device architecture on which the present technologies can be implemented. For example, an architecture having a single processor that handles communications as well as routing computations, etc., is often used. Further, other types of interfaces and media could also be used with the network device 800.

Regardless of the network device's configuration, it may employ one or more memories or memory modules (including memory 806) configured to store program instructions for the general-purpose network operations and mechanisms for roaming, route optimization and routing functions described herein. The program instructions may control the operation of an operating system and/or one or more applications, for example. The memory or memories may also be configured to store tables such as mobility binding, registration, and association tables, etc. The memory 806 could also hold various software containers and virtualized execution environments and data.

The network device 800 can also include an application-specific integrated circuit (ASIC), which can be configured to perform routing and/or switching operations. The ASIC can communicate with other components in the network device 800 via the connection 810, to exchange data and signals and coordinate various types of operations by the network device 800, such as routing, switching, and/or data storage operations, for example.

Figure 9:
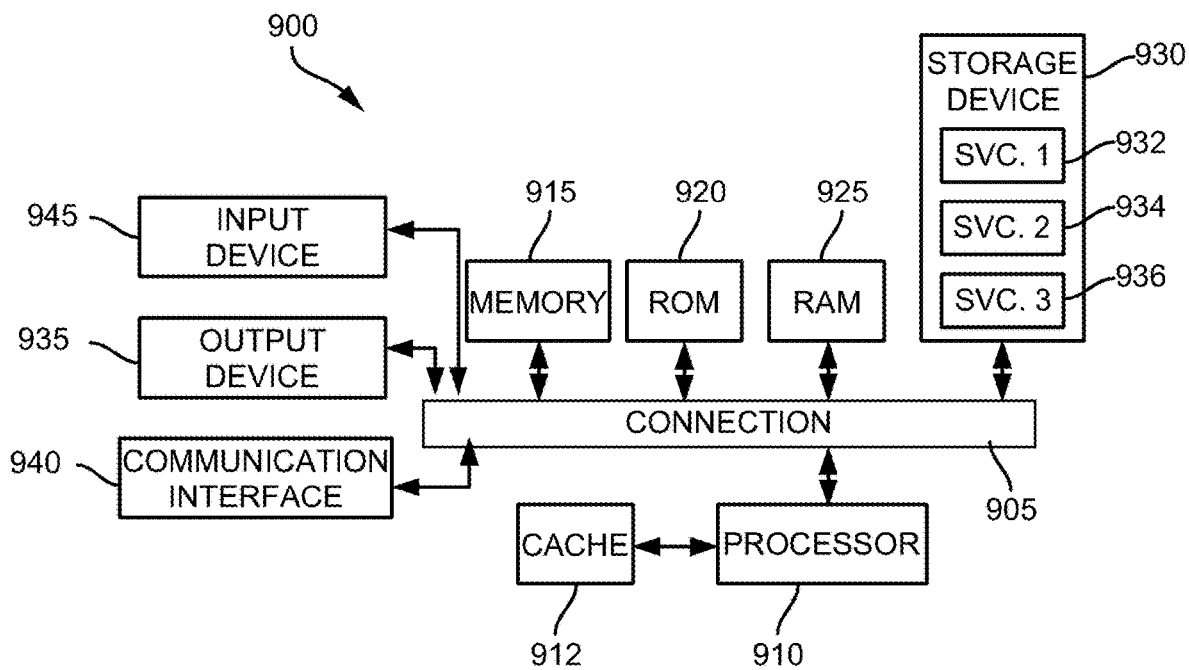
FIG. 9 illustrates an example computing device architecture, in accordance with some examples.

FIG. 9 illustrates an example computing device architecture 900 of an example computing device which can implement the various techniques described herein. The components of the computing device architecture 900 are shown in electrical communication with each other using a connection 905, such as a bus. The example computing device architecture 900 includes a processing unit (CPU or processor) 910 and a computing device connection 905 that couples various computing device components including the computing device memory 915, such as read only memory (ROM) 920 and random access memory (RAM) 925, to the processor 910.

The computing device architecture 900 can include a cache of high-speed memory connected directly with, in close proximity to, or integrated as part of the processor 910. The computing device architecture 900 can copy data from the memory 915 and/or the storage device 930 to the cache 912 for quick access by the processor 910. In this way, the cache can provide a performance boost that avoids processor 910 delays while waiting for data. These and other modules can control or be configured to control the processor 910 to perform various actions. Other computing device memory 915 may be available for use as well. The memory 915 can include multiple different types of memory with different performance characteristics. The processor 910 can include any general purpose processor and a hardware or software service, such as service 1 932, service 2 934, and service 3 936 stored in storage device 930, configured to control the processor 910 as well as a special-purpose processor where software instructions are incorporated into the processor design. The processor 910 may be a self-contained system, containing multiple cores or processors, a bus, memory controller, cache, etc. A multi-core processor may be symmetric or asymmetric.

To enable user interaction with the computing device architecture 900, an input device 945 can represent any number of input mechanisms, such as a microphone for speech, a touch-sensitive screen for gesture or graphical input, keyboard, mouse, motion input, speech and so forth. An output device 935 can also be one or more of a number of output mechanisms known to those of skill in the art, such as a display, projector, television, speaker device, etc. In some instances, multimodal computing devices can enable a user to provide multiple types of input to communicate with the computing device architecture 900. The communications interface 940 can generally govern and manage the user input and computing device output. There is no restriction on operating on any particular hardware arrangement and therefore the basic features here may easily be substituted for improved hardware or firmware arrangements as they are developed.

Storage device 930 is a non-volatile memory and can be a hard disk or other types of computer readable media which can store data that are accessible by a computer, such as magnetic cassettes, flash memory cards, solid state memory devices, digital versatile disks, cartridges, random access memories (RAMs) 925, read only memory (ROM) 920, and hybrids thereof. The storage device 930 can include services 932, 934, 936 for controlling the processor 910. Other hardware or software modules are contemplated. The storage device 930 can be connected to the computing device connection 905. In one aspect, a hardware module that performs a particular function can include the software component stored in a computer-readable medium in connection with the necessary hardware components, such as the processor 910, connection 905, output device 935, and so forth, to carry out the function.

For clarity of explanation, in some instances the present technology may be presented as including individual functional blocks including functional blocks comprising devices, device components, steps or routines in a method embodied in software, or combinations of hardware and software.

In some embodiments the computer-readable storage devices, mediums, and memories can include a cable or wireless signal containing a bit stream and the like. However, when mentioned, non-transitory computer-readable storage media expressly exclude media such as energy, carrier signals, electromagnetic waves, and signals per se.

Methods according to the above-described examples can be implemented using computer-executable instructions that are stored or otherwise available from computer readable media. Such instructions can comprise, for example, instructions and data which cause or otherwise configure a general purpose computer, special purpose computer, or special purpose processing device to perform a certain function or group of functions. Portions of computer resources used can be accessible over a network. The computer executable instructions may be, for example, binaries, intermediate format instructions such as assembly language, firmware, or source code. Examples of computer-readable media that may be used to store instructions, information used, and/or information created during methods according to described examples include magnetic or optical disks, flash memory, USB devices provided with non-volatile memory, networked storage devices, and so on.

Devices implementing methods according to these disclosures can comprise hardware, firmware and/or software, and can take any of a variety of form factors. Some examples of such form factors include general purpose computing devices such as servers, rack mount devices, desktop computers, laptop computers, and so on, or general purpose mobile computing devices, such as tablet computers, smart phones, personal digital assistants, wearable devices, and so on. Functionality described herein also can be embodied in peripherals or add-in cards. Such functionality can also be implemented on a circuit board among different chips or different processes executing in a single device, by way of further example.

The instructions, media for conveying such instructions, computing resources for executing them, and other structures for supporting such computing resources are means for providing the functions described in these disclosures.

Although a variety of examples and other information was used to explain aspects within the scope of the appended claims, no limitation of the claims should be implied based on particular features or arrangements in such examples, as one of ordinary skill would be able to use these examples to derive a wide variety of implementations. Further and although some subject matter may have been described in language specific to examples of structural features and/or method steps, it is to be understood that the subject matter defined in the appended claims is not necessarily limited to these described features or acts. For example, such functionality can be distributed differently or performed in components other than those identified herein. Rather, the described features and steps are disclosed as examples of components of systems and methods within the scope of the appended claims.

Claim language reciting "at least one of" a set indicates that one member of the set or multiple members of the set satisfy the claim. For example, claim language reciting "at least one of A and B" means A, B, or A and B.

What is claimed is:

1. A method of object detection, the method comprising:
   generating one or more object trackers for tracking at least one object detected from on one or more images;
   generating one or more blobs for the at least one object based on tracking motion associated with the at least one object from the one or more images;
   generating one or more tracklets for the at least one object based on associating the one or more object trackers and the one or more blobs, the one or more tracklets including one or more scales of object tracking data for the at least one object;
   determining one or more uncertainty metrics based on the one or more object trackers and an embedding of the one or more tracklets; and
   generating a training module for tracking the at least one object using the embedding and the one or more uncertainty metrics.

2. The method of claim 1, wherein generating the training module comprises generating one or more ground truths for a deep learning model for object detection.

3. The method of claim 2, further comprising:
   detecting the at least one object from the one or more images using the deep learning model.

4. The method of claim 3, further comprising:
   detecting one or more blobs associated with the at least one object based on determining one or more dimensions associated the at least one object, using the one or more ground truths.

5. The method of claim 1, wherein generating the one or more blobs for the at least one object based on tracking motion associated with the at least one object comprises:
   performing a background subtraction on the one or more images;
   generating a morphological foreground mask based on the background subtraction; and
   performing a connected component analysis to identify the one or more blobs.

6. The method of claim 1, wherein generating one or more tracklets for the at least one object based on associating the one or more object trackers and the one or more blobs comprises:
   performing a cost analysis on the one or more object trackers and the one or more blobs; and
   associating data corresponding to the one or more object trackers and the one or more blobs based on the cost analysis.

7. The method of claim 1, wherein the one or more uncertainty metrics comprise one or more of a model uncertainty, data uncertainty, or distributional uncertainty.

8. A system, comprising:
   one or more processors; and
   a non-transitory computer-readable storage medium containing instructions which, when executed on the one or more processors, cause the one or more processors to perform operations including:
   generating one or more object trackers for tracking at least one object detected from on one or more images;
   generating one or more blobs for the at least one object based on tracking motion associated with the at least one object from the one or more images;
   generating one or more tracklets for the at least one object based on associating the one or more object trackers and the one or more blobs, the one or more tracklets including one or more scales of object tracking data for the at least one object;
   determining one or more uncertainty metrics based on the one or more object trackers and an embedding of the one or more tracklets; and
   generating a training module for tracking the at least one object using the embedding and the one or more uncertainty metrics.

9. The system of claim 8, wherein generating the training module comprises generating one or more ground truths for a deep learning model for object detection.

10. The system of claim 9, wherein the operations further comprise:
    detecting the at least one object from the one or more images using the deep learning model.

11. The system of claim 10, wherein the operations further comprise:
    detecting one or more blobs associated with the at least one object based on determining one or more dimensions associated the at least one object, using the one or more ground truths.

12. The system of claim 8, wherein generating the one or more blobs for the at least one object based on tracking motion associated with the at least one object comprises:
    performing a background subtraction on the one or more images;
    generating a morphological foreground mask based on the background subtraction; and
    performing a connected component analysis to identify the one or more blobs.

13. The system of claim 8, wherein generating one or more tracklets for the at least one object based on associating the one or more object trackers and the one or more blobs comprises:
    performing a cost analysis on the one or more object trackers and the one or more blobs; and
    associating data corresponding to the one or more object trackers and the one or more blobs based on the cost analysis.

14. The system of claim 8, wherein the one or more uncertainty metrics comprise one or more of a model uncertainty, data uncertainty, or distributional uncertainty.

15. A non-transitory machine-readable storage medium, including instructions configured to cause a data processing apparatus to perform operations including:
    generating one or more object trackers for tracking at least one object detected from on one or more images;
    generating one or more blobs for the at least one object based on tracking motion associated with the at least one object from the one or more images;
    generating one or more tracklets for the at least one object based on associating the one or more object trackers and the one or more blobs, the one or more tracklets including one or more scales of object tracking data for the at least one object;
    determining one or more uncertainty metrics based on the one or more object trackers and an embedding of the one or more tracklets; and
    generating a training module for tracking the at least one object using the embedding and the one or more uncertainties.

16. The non-transitory machine-readable storage medium of claim 15, wherein generating the training module comprises generating one or more ground truths for a deep learning model for object detection.

17. The non-transitory machine-readable storage medium of claim 16, wherein the operations further comprise:
    detecting the at least one object from the one or more images using the deep learning model.

18. The non-transitory machine-readable storage medium of claim 17, wherein the operations further comprise:
    detecting one or more blobs associated with the at least one object based on determining one or more dimensions associated the at least one object, using the one or more ground truths.

19. The non-transitory machine-readable storage medium of claim 15, wherein generating the one or more blobs for the at least one object based on tracking motion associated with the at least one object comprises:
    performing a background subtraction on the one or more images;
    generating a morphological foreground mask based on the background subtraction; and
    performing a connected component analysis to identify the one or more blobs.

20. The non-transitory machine-readable storage medium of claim 15, wherein generating one or more tracklets for the at least one object based on associating the one or more object trackers and the one or more blobs comprises:
    performing a cost analysis on the one or more object trackers and the one or more blobs; and
    associating data corresponding to the one or more object trackers and the one or more blobs based on the cost analysis.

\* \* \* \* \*